United States Patent [19]

Price

[11] Patent Number: 5,250,651

[45] Date of Patent: Oct. 5, 1993

[54] CROSSLINKED POLYETHER POLYOL SEALANT

[75] Inventor: Jack L. Price, Austin, Tex.

[73] Assignee: Minnesota Mining and Manufacturing Company, St. Paul, Minn.

[21] Appl. No.: 969,408

[22] Filed: Oct. 30, 1992

[51] Int. Cl.$^5$ .............................................. C08G 18/30
[52] U.S. Cl. ...................................... 528/59; 528/76; 528/77
[58] Field of Search .......................... 528/59, 76, 77

[56] References Cited

U.S. PATENT DOCUMENTS

| | | | |
|---|---|---|---|
| 4,645,285 | 2/1987 | Cozzens et al. | 339/96 |
| 4,680,233 | 7/1987 | Camin et al. | 428/424.6 |
| 4,746,381 | 5/1988 | Parker et al. | 156/69 |
| 4,791,156 | 12/1988 | Hostettler | 528/76 |
| 5,034,435 | 7/1991 | Squiller et al. | 523/415 |
| 5,053,465 | 10/1991 | Waddill | 525/528 |
| 5,061,749 | 10/1991 | Ito et al. | 524/850 |
| 5,064,494 | 11/1991 | Duck et al. | 156/273.5 |
| 5,069,637 | 12/1991 | Baubles | 439/412 |
| 5,080,606 | 1/1992 | Burkard | 439/403 |
| 5,090,917 | 2/1992 | Noorily et al. | 439/395 |
| 5,151,484 | 9/1992 | Schmalstieg et al. | 528/45 |

*Primary Examiner*—Maurice J. Welsh
*Attorney, Agent, or Firm*—Gary L. Griswold; Walter N. Kirn; Darla P. Neaveill

[57] ABSTRACT

Sealant compositions useful in insulation displacement connector enclosures comprising a urethane crosslinked polymer of monomers containing a sufficient amount of an isocyanate component to provide from about 1 to about 3 percent NCO wherein said isocyanate component contains at least one aliphatic isocyanate, at least about 100 parts of a polyether component containing at least one polyether selected from the group consisting of polyether polyols, and polyether polyamines, from about 0.005% to about 5.0% of an antioxidant, and from about 0.1% to about 10% of a catalyst, said urethane crosslinked polymer having an isocyanate index of about 60 to about 80, wherein said sealant has a ¼ cone penetration value if from about 20 to about 200 $10^{-1}$ mm.

16 Claims, No Drawings

CROSSLINKED POLYETHER POLYOL SEALANT

BACKGROUND OF THE INVENTION

1. Field of the Invention

The invention relates to crosslinked polyether polyol sealants which contain urethane crosslinks and provide electrical connections under normal operating conditions and at elevated temperatures, and to insulation displacement connectors containing such sealants.

2. Description of the Art

Polyol-containing sealants are known in the art.

U.S. Pat. No. 5,064,494, (Duck et al.) discloses a sealant composition made from a polyol based isocyanate prepolymer and a heat activatable blocked complexed amine. The materials are cured by briefly heating to above 120° C. and subsequently moisture cured.

U.S. Pat. No. 5,061,749 (Ito et al.) discloses a polyol based isocyanate prepolymer and a vinyl polymer containing a hydrolyzable siloxy group. The material is stated to be useful as a sealing material when formulated with proper fillers and plasticizers.

U.S. Pat. No. 5,053,465 (Waddill) discloses sealers comprising a polyol based blocked isocyanate prepolymer epoxy resin blend cured with a polyether polyamine.

U.S. Pat. No. 5,034,435 (Squiller) discloses aqueously dispersed polyol based blocked isocyanate-terminated prepolymer epoxy compositions which are mixed with aliphatic polyamines to form a sealant.

U.S. Pat. No. 5,151,484 (Schmalsteig et al.) discloses isocyanate prepolymers containing ether and ester groups which are used as binders in low solvent or solvent-free, low viscosity, polyurethane coating compositions, sealing compositions or casting compositions.

Sealants are also known for use in insulation displacement connectors. U.S. Pat. No. 4,645,285 discloses an electrical terminal having a slotted insulation displacement section, wherein the terminal is protected by a two-part enclosure. The enclosure is filled with a closed foam sealant. Various foam compositions are disclosed including polyether urethanes, and polyester urethanes having Shore A stiffness values of from about 50 to about 70. The composition is disclosed to be useful up to 250° C., and 97% humidity.

U.S. Pat. No. 4,746,381 discloses an end cap connection which provides a strong mechanical bond and a fluid resistant seal wherein the cap contains a quantity of synthetic resin adhesive. The synthetic resin is disclosed to be a blend of epoxy resins, rubber modifiers, and flexibilizers. No urethane crosslinked compositions are disclosed.

U.S. Pat. No. 4,680,233 discloses a two-layer sealing material which comprises a layer of elastomeric sealant having a cone penetration of from about 100 ($10^{-1}$ mm) to about 350 ($10^{-1}$ mm) and an ultimate elongation of at least 50% and a surface layer of air drying material to permit placement and handling of the sealant and reduce the surface tack of the sealant. It is disclosed that the elastomeric sealants generally have an uncrosslinked oil compound which renders the surface oily. Sealants are disclosed as useful include polysiloxanes, polyurethanes, polybutyls, triblock copolymers and the like.

U.S. Pat. No. 5,069,637 discloses an electrical connector including a contact assembly placed in a cavity. The cavity is sealed except for conductor inlets, and contains a water-proofing or sealing compound. Silicone grease is the only specific sealant disclosed.

U.S. Pat. No. 5,080,606 discloses an electrical connector for interconnecting a variable number of wires in a stacked, in-line configuration. The connector includes a body for receiving the wires, a metallic contact element located within the body and a cover; the body has front and rear walls each having three holes in a stacked, nonlinear arrangement. The connector contains a sealant. Silicone grease is the only sealant specifically disclosed.

U.S. Pat. No. 5,090,917 discloses an electrical connector containing an insulation displacing contact inside a housing. The housing contains a sealing material around the contact which is identified only as a "gel".

The final three references describe insulation displacement connectors which are housed in a sealant containing enclosure. When it is desired to make an electrical connection with sealant already in place, it has been difficult to find a sealant which satisfies the rigorous demands of electrical insulation and environmental protection.

Three critical requirements must be met. Firstly, the sealant must be soft enough so that it will yield to the insertion of thin cross-section wires prior to insulation displacement connection. Secondly, the sealant must possess enough flow to conform to the contours of the inserted wires. Finally, it must also prevent moisture and other environmental contaminants from reaching the connection. These environmental contaminants include such compositions as insecticides, detergents and the like.

These sealants are typically formulated using one of three approaches; gels formed from liquids by adding particulate fillers to raise viscosity, gels formed from solid materials softened by plasticizers, and greases.

While various of these gel sealants will adequately provide both the required environmental sealing and electrical insulation at room temperature, gel sealants tend to lose their viscosity as the ambient temperature increases, and may begin to exhibit fluid flow characteristics. The sealant may even flow away from the IDC enclosure, leaving the electrical connection unprotected. Further, the sealant will be susceptible to attack by moisture, and other environmental stresses, further reducing its protective properties.

Effective sealant materials for IDCs may also be formed from polyurethane compositions. However, these materials are generally too rigid when cured to conform to the contours required. This is especially true when the polyurethane composition contains a stoichiometric excess of isocyanate component. The typical solution for this rigidity is to plasticize the composition; however, highly plasticized polyurethane compositions are extremely susceptible to degradation by fluid contaminants, such as detergent solutions and hydrocarbon fluids.

The present inventor has now discovered that certain polyether polyols or polyether polyamines lightly crosslinked using a stoichiometric deficit of an isocyanate reactant provide sealant compositions which overcome the deficiencies of prior art sealants used in IDC enclosures and void spaces incompletely enclosed. In the instant case, the reaction between polyether species and isocyanate species results in a gel-like polymer which is lightly crosslinked through urethane linkages. The resulting polymer material exhibits all the desirable electrical properties and environmental protection and is a soft, conformable sealant without containing any plasticizers which could increase susceptibility to environmental contaminants. In fact, no fillers or adjuvants are required to provide sealant compositions having the desirable electrical properties and conformability.

SUMMARY OF THE INVENTION

The invention provides sealant compositions comprising a polyether component and an isocyanate component, an antioxidant, and a catalyst which provide hydrophobicity and temperature stability at higher temperatures than conventional sealants.

Specifically, sealant compositions of the invention, suitable for use in enclosures, comprise a urethane crosslinked polymer of monomers containing a sufficient amount of at least one isocyanate component to provide from about 1 to about 3 percent NCO wherein said isocyanate component contains at least one aliphatic isocyanate, at least about 100 parts of a polyether component containing at least one polyether selected from the group consisting of polyether polyols, and polyether polyamines, from about 0.1% to about 10.0% of an antioxidant, and from about 0.005% to about 5% of a catalyst, said urethane crosslinked polymer having an isocyanate index of about 60 to about 80, wherein said sealant has a ¼ cone penetration value if from about 20 to about 200 $10^{-1}$ mm.

Preferred sealants of the invention, suitable for use in an enclosure, comprise a urethane crosslinked polymer of monomers containing a sufficient amount of at least one isocyanate component to provide from about 1 to about 2 percent NCO wherein said isocyanate component contains at least one aliphatic isocyanate, at least about 100 parts of a polyether component containing at least one polyether polyol, from about 0.1% to about 10.0% of an antioxidant, and from about 0.005% to about 5% of a catalyst, said urethane crosslinked polymer having an isocyanate index of from about 70 to about 75, wherein said sealant has a ¼ cone penetration value of from about 40 to about 200 $10^{-1}$ mm, and an electric current leakage of less than about 0.25 microamp after having being soaked in an aqueous saline/detergent bath for two 24 hour periods, said periods having been separated by thermal cycling between temperatures of from about $-40°$ to about $150°$ C.

Suitable polyethers have molecular weights of from about 60 to about 25,000; preferably from about 200 to about 10,000, most preferably from about 400 to about 6,000.

Sealants of the invention, which provide high levels of electrical insulation and hydrophobicity, are especially suitable for introduction into enclosures surrounding electrical connections made by insulation displacement. These compositions are liquid in their uncured condition, and may be readily introduced into suitable enclosures. In the presence of a catalyst, the compositions develop the lightly crosslinked structure of the final sealant, which is relatively soft and deformable but resists flow. It is usual practice to cure the sealant within the enclosure prior to introduction and connection of the wires. Sealant compositions of the invention are particularly effective in allowing wires of a variety of sizes, including small gauges, to be inserted into the connector. The sealant thereafter conforms to the contours of the wire to provide an effective barrier to the ingress of contaminants.

In a highly preferred embodiment, a sealant of the invention is introduced into an insulation displacement connector for interconnecting a variable number of wires in a stacked, in-line configuration.

The invention also provides an improved, highly-compact, insulation displacement connector comprising an electrically insulative body having an open side, a rear wall and a front wall, said front wall having at least three holes and said rear wall having at least three holes, at least one of said holes in said front wall having a rupturable membrane, and at least one of said holes in said rear wall having a rupturable membrane, and said holes in said front and rear walls being in a stacked, non linear arrangement;

insulation displacement means located within said body for providing an electrical connection between wires which may be inserted through said holes in said front wall, and between wires which may be inserted through said holes in said rear wall, a sealant located within said body for providing electrical insulation, and environmental protection, said sealant comprising a sufficient amount of an isocyanate component to provide from about 1 to about 3 percent NCO, said isocyanate component containing at least one aliphatic isocyanate, at least about 100 parts of a polyether component containing at least one polyether polyol, from about 0.1% to about 10.0% of an antioxidant, and from about 0.005% to about 5% of a catalyst, said urethane crosslinked polymer having an isocyanate index of about 60 to about 80, wherein said sealant has a ¼ cone penetration value of from about 40 to about 200 $10^{-1}$ mm.

As used herein, these terms have the following meanings.

1. The term "elastomer" refers to a rubbery material which, when deformed, will return to approximately original dimensions in a relatively short time.

2. The term "percent NCO" indicates the weight of isocyanate functionality present in a sealant composition as a percent of the total weight of the composition.

3. The term "isocyanate index" and "NCO-index" as used herein refer to the ratio of NCO groups over reactive hydrogen atoms present in a polyurethane formulation given as a percentage:

$$NCO\text{-index} = \frac{(NCO)}{(\text{active hydrogen})} \times 100$$

In other words, the NCO-index expresses the percentage of isocyanate actually present in a formulation with respect to the amount of isocyanate theoretically required for reacting with the amount of isocyanate reactive hydrogen used in a formulation.

The expression "active hydrogen atoms" as used here for the purpose of calculating the isocyanate index refers to the total of hydroxyl and amine hydrogen atoms present in the reactive compositions in the form of polyols and polyamines. This means that for the purpose of calculating the isocyanate index one hydroxyl group is considered to comprise one active hydrogen. One primary amine group is also considered to comprise one active hydrogen, because of the excess of active hydrogens. The Zerewitnoff test used to determine active hydrogen is described in *Journal of the American Chemical Society*, Volume 49, page 3181 (1927).

4. The term "polyether component" means a compound or blend of compounds containing active hydrogen atoms.

5. The terms "equivalent weight" and "molecular weight" as used throughout the present specification refer to equivalent weight values that may be calculated by measuring the content of functional groups per weight of sample, and the molecular weight values that may be calculated from the aforementioned equivalent weight and the theoretical functionality of the compound (i.e., by the total number of hydrogen atoms attached to an oxygen atom and/or a nitrogen atom).

6. The term "polyol" means a substance containing at least two hydroxyl groups attached to a single molecule.

7. The term "polyamine" includes primary and secondary amines.

8. The term "IDC" means an insulation displacement connector of any type known to the industry.

Percents, ratios and parts described herein are by weight unless otherwise specifically stated.

DETAILED DESCRIPTION OF THE INVENTION

Useful sealants include those adopting a gel-like condition which will remain essentially unchanged over an extended range of temperatures up to about 125° C. Preferably, sealants of this type are stored prior to use in such a fashion that the catalyst and the isocyanate are not in contact with one another or are introduced to the enclosure immediately upon formulation. Various approaches are known for such separation, e.g., using a two-part syringe, which has the isocyanate component in one reservoir, and the polyether component and catalyst in a second reservoir; providing the fluid formulation and adding catalyst immediately prior to use, etc.

Suitable sealants comprise at least one isocyanate component. Suitable isocyanate components include at least one aliphatic isocyanate having the required functionality. The isocyanate should be present in sufficient amount to provide an isocyanate index of from about 60 to about 80; however, the isocyanate component should not be present in an amount equal to or greater than a stoichiometric equivalent of the active hydrogen present. Equivalents for each component can be calculated by dividing the actual weight (in parts) of each component by the equivalent weight. A sufficient amount of at least one aliphatic isocyanate must be present in the isocyanate component which provides from about 1 to about 3 percent NCO, preferably from about 1 to about 2 percent NCO.

The term isocyanate also includes isocyanate-terminated prepolymers. Polyisocyanates may be linear or branched, aliphatic, cycloaliphatic, araliphatic, heterocyclic or aromatic, or any combination of such polyisocyanates, with the proviso that at least one polyisocyanate must be aliphatic. When the isocyanate component contains only one compound, it is an aliphatic isocyanate. Particularly suitable polyisocyanates correspond to the formula $$Q(NCO)_n$$

in which n is an integer of from about 2 to about 4, and Q is selected from an aliphatic hydrocarbon radical containing from about 2 to about 100 carbon atoms, and zero to 50 heteroatoms; a cycloaliphatic hydrocarbon radical containing from 4 to 100 carbon atoms and zero to 50 heteroatoms; an aromatic hydrocarbon radical or heterocyclic aromatic radical containing from 6 to 15 carbon atoms and zero to 10 heteroatoms, and an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of polyisocyanates include ethylene diisocyanate, 1,4-tetramethylene diisocyanate, 1,6-hexamethylene diisocyanate, trimethylhexamethylene diisocyanate, 1,12-dodecyl diisocyanate, cyclobutyl-1,3-diisocyanate cyclohexyl-1,3 and 1,4-diisocyanate and mixtures thereof, 1-isocyanato-3,3,5-trimethyl-5-isocyanatomethyl cyclohexane (German Auslegeschrift No. 1,202,785, U.S. Pat No. 3,401,190), 2,4- and 2,6-tolyl diisocyanate and mixtures thereof, hexahydro-1,3 -and/or -1,4- phenylene diisocyanate, hexahydro-2,4'- and/or 4,4'-diphenylmethane diisocyanate, 1,3-and 1,4- phenylene diisocyanate, 2,4- and 2,6-tolyl diisocyanate and mixtures thereof, diphenylmethane-2,4'-and/or 4,4'diisocyanate, naphthylene-1,5-diisocyanate, $C_{36}$ dimer acid diisocyanate (DDI) and the reaction products of four equivalents of the aforementioned isocyanate-containing compounds with compounds containing two isocyanate-reactive groups.

Also useful are e.g., triphenyl methane-4,4',4"-triisocyanate, polyphenyl polymethylene polyisocyanates of the type obtained by condensing aniline with formaldehyde, followed by phosgenation, (British Pat. Nos. 874,430 and 848,671), m- and p-isocyanatophenyl sulphonyl isocyanates (U.S. Pat. No. 3,454,606), perchlorinated aryl polyisocyanates (U.S. Pat. No. 3,277,138), polyisocyanates containing carbodiimide groups (U.S. Pat. Nos. 3,152,162, 4,088,665 and 4,344,855), norbornane diisocyanates (U.S. Pat. No. 3,492,330), polyisocyanates containing allophanate groups (British Pat. No. 994,890, Belgian Pat. No. 761,626 and U.S. Pat. No. 3,769,318), polyisocyanates containing isocyanurate groups (U.S. Pat. Nos. 3,001,973, and 3,738,957, German Pat. Nos. 1,022,789, 1,222,067 and 1,027,394, and German Offenlegungsschrift No. 1,929,034), polyisocyanates containing urethane groups (Belgian Pat. No. 752,261 and U.S. Pat. Nos. 3,394,164 and 3,644,457), polyisocyanates containing acrylated urea groups (U.S. Pat. No. 3,517,039), polyisocyanates containing biuret groups (U.S. Pat. Nos. 3,124,605, and 3,201,372 and British Pat. No. 889,050), polyisocyanates produced by telomerization reactions (U.S. Pat. No. 3,654,106), polyisocyanates containing ester groups (British Pat. Nos. 964,474 and 1,072,956, U.S. Pat. No. 3,567,763 and German Pat. No. 1,231,688), reaction products of the above-mentioned diisocyanates with acetals (German Patent No. 1,072,385), polyisocyanates containing polymeric fatty acid esters (U.S. Pat. No. 3,455,883), and araliphatic polyisocyanates (U.S. Pat. No. 4,051,166).

Also useful are distillation residues having isocyanate groups obtained in the commercial production of isocyanates, optionally in solution in one or more of the above-mentioned polyisocyanates. It is also possible to use mixtures of any of the above-mentioned polyisocyanates.

Preferred polyisocyanates include hexamethylene diisocyanate, the isocyanurate thereof; 1-isocyanato-3,3,5-trimethyl-5-isocyanatomethyl cyclohexane (isophorone diisocyanate); the tolylene diisocyanates; the mixture of tolyl diisocyanate and hexamethylene diisocyanate; the reaction product of 1 mol of trimethylol propane and 3 mols of tolyl diisocyanate, crude diphenyl methane diisocyanate, dimer acid diisocyanate (DDI) and 4,4'-methylene-bis (cyclohexyl diisocyanate).

The polyether component of the invention comprises at least one polyether polyol or polyether polyamine, and may be completely linear, completely branched or a mixture thereof. Polyols useful in the invention are liquid or quasi-liquid polyols, with functionality from 2 to about 8, di-or trifunctional polyols being preferred. Suitable polyols have molecular weights of about 60 to about 25,000, preferably about 200 to about 10,000, most preferably from about 400 to about 6,000.

Suitable polyether polyols may be selected from polyether polyols based on ethylene oxide, propylene oxide, butylene oxide, tetrahydrofuran, epichlorohydrin or mixtures thereof, polythioether polyols, polyester polyols, polymer polyols, and the like. Sucrose polyethers (German Auslegeschrift Nos. 1,176,358 and 1,064,938) and formitol-or formose-started polyethers (U.S. Pat. Nos. 4,187,355 and 4,247,654) may also be used.

The general term polyether component also includes those polyols referred to as amine-based or amide-based polyols. When propylene oxide and ethylene oxide are utilized to prepare the polyether polyol, it is preferred that the oxypropylene content thereof be at least 60 weight percent, more preferably at least about 70 weight percent and most preferably at least about 80 weight percent. Illustrative examples are the polypropylene oxide glycols, polypropylene oxide triols or ethylene oxide capped polypropylene oxide triols available either under the Arcol TM or Pluracol TM trade names.

The polyether component may consist of a single polyether polyol, a blend of two polyether polyols, a single polyether polyamine, or a blend of polyether polyols and polyether polyamines.

Additional nonpreferred types of polyols may also be included in the blend in minor amounts, e.g., polyacetals, polycarbonates, polyhydroxyls, polyalkadienes, and the like, so long as the amount added will not result in a sealant outside of the critical cone penetration values, and temperature requirements. An excess of isocyanate-reactive component should be present.

Modified polyols may also be useful, i.e., before they are used in the polyisocyanate/polyaddition process, the above-mentioned polyether and polyester polyols may be modified in various ways. Thus, according to U.S. Pat. No. 3,849,515, a mixture of different compounds, e.g., a polyether polyol and a polyester polyol, may be condensed by etherification in the presence of a strong acid to form a polyol which is made up of different segments attached through ether bridges.

Any conventional catalyst used in the preparation of polyurethanes may be employed herein. To facilitate the reaction from about 0.005% to about 5.0%, preferably 0.05% to 2.5% by weight of the total reactants, of catalyst is added. Suitable catalysts include organometallic chelates, alcoholates, phenolates, and salts of organic acids, tertiary amines, organic tin compounds, bicyclic amidines, silaamines, acidic metal salts of strong acids, tertiary phosphines, alkali and alkali earth metal hydroxides, and the like, and combinations thereof.

Exemplary organometallic catalysts include catalytically active compounds of tin, iron, mercury, bismuth, zinc, manganese, lead, copper, cobalt, titanium, antimony, cadmium, aluminum, nickel, cerium, vanadium, and the like. Illustrative of the above compounds would be stannous octoate, bismuth neodecanoate, lead naphthenate, phenylmercuric benzoate, lead ethylhexanoate, and ferric acetyl acetonate. Suitable organic tin compounds include tin (II) salts of carboxylic acids such as tin ethylhexanoate and tin laurate and the tin (IV) compounds, such as dibutyl tin dilaurate, dibutyl tin oxide, dimethyl-tin (IV)-bis-thiolauryl, dibutyl tin-bis-thioglycolic acid octyl ester, and the like.

Useful tertiary amines include, for example, N-methyl morpholine, bis(2-dimethylaminoethyl) ether, 1-methyl-4-dimethylaminoethyl piperazine, dimethyl benzylamine, triethylamine, 1,8-diazabicyclo(5,4,0)-undec-7-ene (DBU) and salts thereof, 1,4-diazabicyclo(2,2,2) octane, triethylene diamine, and the like.

The compositions also includes from about 0.1 to about 10% of an antioxidant. Useful antioxidants include, but are not limited to, octadecyl 8 (3,5-tert-butyl-4-hydroxyphenol) propionate, available as Irganox TM 1076, from Ciba Geigy Company; octylated diphenylamines, available as Agerite Stalite TM from R.T. Vanderbilt Co, 2-mercaptotoluimidazole, available as "Vanox MT/I" from R.T. Vanderbilt Co, and the like.

Fillers or combinations of fillers may also be present, such as glass or polymeric microspheres, glass fibers, graphite fibers, fibrous materials emanating from an organic polymer, carbon black, mica, aluminum oxide hydrates, various silicates or carbonates or clays, fumed silica and the like. The term "filler" is used herein to include all solid additives including particulate matter or fibrous matter, present in the composition. Illustrative of the above materials is a fumed silica available under the trade name Cab-O-Sil TM from Cabot, and "Wollastonite", a clay filler available from Nyco Chemicals, Inc.

The sealants have cone penetration values of from about 20 $10^{-1}$ mm to about 200 $10^{-1}$ mm. Preferred sealants fall into two different groups; those which are to be introduced into complete enclosures and those which are to be introduced into voids which are not completely enclosed. For the latter, the preferred cone penetration values range from about 20 $10^{-1}$ mm to about 75 $10^{-1}$ mm. For those sealants to be introduced into complete enclosures, especially where those enclosures are insulation displacement connectors, preferred cone penetration values are from about 40 $10^{-1}$ mm to about 150 $10^{-1}$ mm, more preferably from about 50 $10^{-1}$ mm to about 100 $10^{-1}$ mm.

Although the crosslinking reactions to prepare the elastomeric compositions of the present invention are preferably conducted at or near ambient temperature, it should be obvious to one skilled in the art that the reaction rate may be accelerated, if desired, by the application of elevated temperatures.

It is also possible to add other additives, so long as the addition thereof does not result in a loss of the required characteristics, i.e., cone penetration values. The above mentioned ingredients are not to be construed as inclusive of all acceptable materials falling within the scope of this invention. They are merely cited as examples. Those skilled in the art will readily see that there are other materials which will have the effect noted in the examples which follow. Therefore, it is within the ability of those skilled in the art to identify materials to obtain a particular polyether polyol sealant as taught by this invention to meet the desired criteria for a particular application.

In order to make sealants of the invention, the isocyanate reactive blend is mixed together. Other additives, fillers and the catalyst are mixed. The isocyanate is then added to the blend and the elastomer is then cured, either at ambient temperature or elevated temperature, as desired.

Compositions of the present invention are useful as sealants, and encapsulants. These sealants, because of their conformability are typically used in enclosed spaces of various types. One preferred use is in the IDC connector, as discussed above. Another use is within a bulkhead or channel as a portion of an automobile or aircraft wiring harness to protect connections from moisture in other areas of the mechanism.

In an especially preferred embodiment of the invention, an insulation displacement connector having improved electrical properties and environmental contaminant resistance is provided comprising an electrically insulative body and an electrically conductive contact element, the body having at least three entrances or holes for receiving the wires to be connected, and the holes being arranged in a staggered or stacked manner. The contact element includes a plurality of U-shaped slots, these slots being staggered at different levels and spaced locations in order to make contact with the stacked wires. More than one contact element may be employed for specialized wire connections.

For compositions at the lower end of the range of cone penetration values, e.g., 50 ($10^{-1}$ mm) or below, the sealants may also be deposited into an connector which does not completely enclose the sealant. For these sealants, curing will occur before the sealant would flow out of the partial enclosure.

The following examples are for illustrative purposes only, and are not limiting to the scope of the invention. Variations within the claimed scope may easily be rendered by one skilled in the art. All parts, percents, and ratios are by weight unless otherwise indicated. Where a particular test was not run in a particular example, this is indicated by a dashed line.

Test Methods

One-Quarter Cone Hardness

Hardness was tested using ASTM Test Method "D1403".

Swelling Test

Sealant samples were weighed and placed in beakers with an automotive fluid (e.g., gasoline, steering fluid, brake fluid, or motor oil, as specified). The sealant samples were removed from the beaker at 70 hours and weighed. The change in weight is reported as percent change from the original weight.

Thermal Stability/Hydrophobicity

Sealant samples were subjected to a variety of adverse conditions using a soak-thermal cycle-soak sequences, followed by electrical resistance measurements and visual examination. Initially the samples were soaked in an aqueous solution containing 5% by weight sodium chloride, and 1% by weight of potassium dodecyl benzene sulfonate detergent, Tradename Plus E, available from Zep Mfg. Co. After 24 hours, the samples were tested for electrical resistance. The same samples were then subjected to thermal cycling between $-40°$ C. and $150°$ C. for three days. The same samples were then subjected to a second soak in the saline/detergent solution for another 24 hours. The electrical resistance of the sealant samples was again measured. To be acceptable, the electric current leakage must consistently be less than 0.25 microamp, and the physical characteristics of the sealant should be unchanged by the testing.

Electric Current Leakage Test

A 16 AGW wire was inserted to a depth of 0.254 cm (0.10 in) into the sealant contained in a vial. The vial was then submerged in a 5% saline/1% detergent bath with the opposite end of the wire remaining above the surface. A 50 volt potential was applied to the wire and the resistance through the sealant was measured and related to a current leakage. The sealant was considered to pass if the current leakage was less than 0.25 microamp.

EXAMPLES

Example 1

To 100 parts poly(butylene oxide)triol, available as "XU 15170.01" from Dow Chemical Co., was added 15.2 parts of dimer diisocyanate (DDI), from Henkel GmbH, 1.0 part octadecyl 8 (3,5-tert-butyl-4-hydroxyphenol) propionate antioxidant, available as Irganox TM 1076, from Ciba Geigy Company, and 0.2 part bismuth/zinc neodecanoate initiator, available as Bicat TM 8, from Shephard Chemical. These materials were stirred at room temperature for about 1 minute until a polyurethane sealant was formed. The isocyanate index was 67.

The sealant was measured for hardness using the quarter cone penetration test, and a value of 183 ($10^{-1}$ mm) penetration was obtained. The sealant was also subjected to the thermal stability/hydrophobicity test; the electrical measurements consistently showed less than 0.25 microamp current leakage, and the samples were physically unchanged after the tests.

Example 2

A urethane crosslinked polyether sample was prepared according to Example 1, with the exception that 400 parts of Wollastonite clay filler was added.

Hardness was measured using the quarter cone penetration test, and a value of 167 ($10^{-1}$mm) was obtained. The filler increased the hardness of the sealant composition.

The sealant was also subjected to the electric current leakage test. The sealant leakage was less the 0.25 microamp at all times, and the samples were physically unchanged after the tests.

Example 3

To 100 parts poly(butylene oxide)triol, available as "XU 15170.01" from Dow Chemical Co., was added 15.8 parts of DDI, available as DDI 1410, from Henkel GmbH, 1.0 part octadecyl 8 (3,5-tert-butyl-4-hydroxyphenol) propionate antioxidant, available as Irganox TM 1076, from Ciba Geigy Company, and 0.2 part bismuth/zinc neodecanoate initiator, available as Bicat TM 8, from Shephard Chemical. These materials were stirred at room temperature until a polyurethane sealant was formed.

The sealant was then applied to a plane surface inclined at 60°, and tested for 3 days by cycling the samples from −40° C. to 125° C. The sealant showed no tendency to flow.

The sealant was then exposed to a variety of fluids and the results are shown in Table 1.

Example 4

A sealant was prepared according to Example 3 except that 100 parts polypropylene oxide/bisphenol A epoxy triol available as Baygal TM P120, available from Miles, was combined with 11.5 parts of DDI, 1.0 part Irganox 1076 TM, and 0.1 part Bicat 8.

The sealant was then applied to a plane surface inclined at 60°, and tested for 3 days by cycling the samples from −40° C. to 125° C. The sealant showed no tendency to flow.

The sealant was then exposed to a variety of fluids and the results are shown in Table 1.

TABLE 1

| FLUID | WEIGHT GAIN (%) | |
|---|---|---|
| | EX. 3 | EX. 4 |
| GASOLINE | 138.5 | 18.8 |
| BRAKE FLUID | 3.0 | 15.5 |
| POWER STEERING FLUID | 34.3 | 7.8 |
| MOTOR OIL | 6.4 | 3.5 |

Example 6

To 100 parts polypropylene oxide/bisphenol A epoxy triol, available as Baygal TM PI20 from Miles, was added 12.32 parts of dimer diisocyanate (DDI), from Henkel GmbH, 0.25 part octylated diphenylamine antioxidant, available as Agerite Stalit TM from R.T. Vanderbilt Co., 0.25 part 2-mercaptotoluimidazole antioxidant, available as Vanox TM MT I from R.T. Vanderbilt Co., and 0.12 part bismuth/zinc neodecanoate initiator, available as Bicat TM 8, from Shephard Chemical. These materials were stirred at room temperature for approximately 1 min. until a polyurethane sealant was formed. The isocyanate index was 67.

The sealant was measured for hardness using the quarter cone penetration test, and a value of 68 $10^{-1}$ mm penetration was obtained. The sealant was also subjected to the thermal stability/hydrophobicity test; the electrical leakage consistently were less than 0.25 microamp, and the samples were physically unchanged after the tests.

A disc of sealant (0.5 cm thick ×2.0 cm diameter) was placed on an aluminum coated ramp at 60° from horizontal and placed in an oven at 150° C. for 24 hours without significant deformation or movement.

Example 7

This composition is suitable for use in applications wherein the enclosure is not complete or in applications requiring the filling of very small voids which exist between individual structures such as wires which may be used to form, e.g., a wiring harness. The cured composition forms within the very small voids, sealing them off from external influences. It is desirable that the reactive components be maintained in a separated condition until introduced into the spatial volume which requires to be sealed. The separation of components is accomplished using a two-barrel syringe. One barrel contains the polyether polyol with catalyst and antioxidant. The other barrel contains the isocyanate reactant as follows.

A composition comprising 100.0 g Baygal TM P120; 2.0 g Bicat 8; 0.25 g Irganox 1076 and 0.25 g Ethanox TM 398 (2,2′-ethylidenebis(4,6-di-t-butylphenyl-fluorophosphonite)) from Ethyl Corp. was blended and placed in the larger volume side of a two-barrel syringe. A composition comprising 8.72 g DDI and 2.18 g Mondur TM E1424, a blend of 2,4′methylene diisocyanate, and 4,4′methylene diisocyanate, available from Miles, was placed in the other barrel. The two part plunger was installed in the barrel portion of the syringe so that simultaneous ejection of the polyol and isocyanate compositions could be accomplished. The needle portion of the syringe was inserted between closely spaced wires which formed a wiring harness. A rubber grommet had previously been placed around the wire bundle into which the needle was inserted. When pressure was applied to the syringe, quantities of fluids from each barrel were injected into the void space between wires. There the crosslinking reaction proceeded to seal off the voids and encapsulate the wire bundle. The cured sealant material had a ¼ cone penetration value of 51 $10^{-1}$ mm. The wire bundle was placed in an orientation such that the water could be placed above the sealed section, which was surrounded by the grommet. This configuration was retained for a period of five days without any evidence of the water crossing the sealant barrier.

What is claimed is:

1. A sealant composition comprising a urethane crosslinked polymer of monomers containing
   a sufficient amount of at least one isocyanate component to provide from about 1 to 3 percent NCO wherein said isocyanate component contains at least one aliphatic isocyanate,
   at least about 100 parts of a polyether component containing at least one polyether selected from the group consisting of polyether polyols and polyether polyamines, from about 0.005% to about 5.0% of an antioxidant, and from about 0.1% to about 10% of a catalyst, said urethane crosslinked polymer having an isocyanate index of from about 60 to about 80; wherein said sealant has a ¼ cone penetration value of from about 20 to about $200^{-1}$ mm, said isocyanate reacting with said polyether component to form said urethane crosslinked polymer when all ingredients are combined.

2. A sealant composition according to claim 1 wherein said sealant is capable of deformation to allow insertion of fine gauge wires.

3. A sealant composition according to claim 1 wherein said sealant does not exhibit fluid flow in the temperature range of from about −40° C. to about 150° C.

4. A sealant composition according to claim 1 wherein said sealant contains at least one polyether polyol selected from the group consisting of poly(butylene oxide)triol, and polypropylene oxide/bisphenol A epoxy triol.

5. A sealant composition according to claim 1 wherein said sealant contains dimer diisocyanate.

6. A sealant according to claim 1 wherein said sealant has an electrical current leakage of less than about 0.25 microamp after having being soaked in an aqueous saline/detergent bath for two 24 hour periods, said periods having been separated by thermal cycling between temperatures of from about −40° to about 150° C.

7. A sealant composition according to claim 1 comprising a urethane crosslinked polymer of monomers containing sufficient amount of at least one isocyanate component to provide from about 1 to about 2 percent NCO wherein said isocyanate component contains at least one aliphatic isocyanate, at least about 100 parts of a polyether component containing at least one polyether polyol, from about 0.005% to about 5.0% of an antioxidant, and from about 0.1% to about 10% of a catalyst, said urethane crosslinked polymer having an isocyanate index of from about 70 to about 75, wherein said sealant has a ¼ cone penetration value of from about 20 to about 200 $10^{-1}$ mm, and an electrical current leakage of less than about 0.25 microamp after having being soaked in an aqueous saline/detergent bath for two 24 hour periods, said periods having been separated by thermal cycling between temperatures of from about $-40°$ to about $150°$ C.

8. A sealant composition according to claim 1, suitable for use in a complete enclosure, having a cone penetration value of from about 40 $10^{-1}$ mm to about 200 $10^{-1}$ mm.

9. A sealant composition according to claim 8 having a cone penetration value of from about 100 $10^{-1}$ mm to about 200 $10^{-1}$ mm.

10. A sealant composition according to claim 1, suitable for introduction into a void space, said void space not being completely enclosed, having a cone penetration value of from about 20 $10^{-1}$ mm to about 75 $10^{-1}$ mm.

11. A sealant composition according to claim 1, suitable for insertion into a void space, said space not being completely enclosed, said sealant having a cone penetration value of from about 20 $10^{-1}$ mm to about 50 $10^{-1}$ mm.

12. A covered insulation displacement connector comprising a body, and containing a sealant composition according to claim 1 enclosed within said body.

13. An insulation displacement connector according to claim 12, comprising an electrically insulative body having an open side, a rear wall and a front wall, said front wall having at least three holes and said rear wall having at least three holes, at least one of said holes in said front wall having a rupturable membrane, and at least one of said holes in said rear wall having a rupturable membrane, and said holes in said front and rear walls being in a stacked, non linear arrangement;

insulation displacement means located within said body for providing an electrical connection between wires which may be inserted through said holes in said front wall, and between wires which may be inserted through said holes in said rear wall, a sealant located within said body for providing electrical insulation, and environmental protection, said sealant comprising a sufficient amount of an isocyanate component to provide from about 1 to about 2 percent NCO wherein said isocyanate component contains at least one aliphatic isocyanate, at least about 100 parts of a polyether component containing at least one polyether selected from the group consisting of polyether polyols and polyether polyamines, from about 0.005% to about 5.0% of an antioxidant, and from about 0.1% to about 10% of a catalyst, said urethane crosslinked polymer having an isocyanate index of about 60 to about 80, wherein said sealant has a ¼ cone penetration value of from about 50 to about 100 $10^{-1}$ mm.

14. An insulation displacement connector according to claim 13 wherein said sealant comprises a sufficient amount of at least one isocyanate component to provide from about 1 to about 2 percent NCO wherein said isocyanate component contains at least one aliphatic isocyanate, at least about 100 parts of a polyether component containing at least one polyether polyol, from about 0.005% to about 5.0% of an antioxidant, and from about 0.1% to about 10% of a catalyst, said urethane crosslinked polymer having an isocyanate index of from about 70 to about 75, wherein said sealant has a ¼ cone penetration value if from about 100 to about 200 $10^{-1}$ mm, and an electrical current leakage of less than about 0.25 microamp after having being soaked in an aqueous saline/detergent bath for two 24 hour periods, said periods having been separated by thermal cycling between temperatures of from about $-40°$ to about $150°$ C.

15. A method of introducing a sealant according to claim 1 into a void space comprising the steps of a) providing a two-barrel syringe having a first larger barrel and a second smaller barrel, a needle portion, and a two part plunger therefore, c) introducing said polyether component, said antioxidant, and said catalyst into said first larger barrel of said two-barrel syringe, b) introducing said isocyanate component of said sealant into said second smaller barrel of said two-barrel syringe, c) installing said two part plunger into said syringe, so that simultaneous ejection of the polyol and isocyanate compositions could be accomplished, d) inserting said needle portion of said syringe between closely spaced wires having said void space therebetween, said wires having a grommet therearound into which the needle is inserted, e) applying pressure to the syringe, quantities of fluids from each barrel said two-part plunger portion of said syringe, thereby injecting both said isocyanate component and said polyether component into said void space between said wires, f) allowing said components to cure into a sealant, said sealant having a ¼ cone penetration value if from about 20 to about 200 $10^{-1}$ mm.

16. A method according to claim 14 wherein said sealant has a ¼ cone penetration value if from about 20 to about 75 $10^{-1}$ mm.

* * * * *

UNITED STATES PATENT AND TRADEMARK OFFICE
CERTIFICATE OF CORRECTION

PATENT NO.    :   5,250,651

DATED         :   10/05/93

INVENTOR(S)   :   Jack L. Price

It is certified that error appears in the above-identified patent and that said Letters Patent is hereby corrected as shown below:

Column 9, Line 36, "an connector" should read --a connector--.

Column 11, Line 34, "PI20" should read --P120--.

Column 13, Line 4, before "sufficient" insert --a--.

Column 14, Line 25, "if" should read --of--.

Column 14, Line 37, "c)" should read --b)--.

Column 14, Line 40, "b)" should read --c)--.

Column 14, Line 43, "c)" should read --d)--.

Column 14, Line 46, "d)" should read --e)--.

Column 14, Line 50, "e)" should read --f)--.

UNITED STATES PATENT AND TRADEMARK OFFICE
CERTIFICATE OF CORRECTION

PATENT NO.    :    5,250,651

DATED         :    10/05/93

INVENTOR(S)   :    Jack L. Price

It is certified that error appears in the above-identified patent and that said Letters Patent is hereby corrected as shown below:

Column 14, Line 55, "f)" should read --g)--.

Column 14, Line 56, "if" should read --of--.

Column 14, Line 59, "if" should read --of--.

Signed and Sealed this

Sixth Day of September, 1994

Attest:

BRUCE LEHMAN

Attesting Officer　　　Commissioner of Patents and Trademarks